(12) United States Patent
Zonoun

(10) Patent No.: US 7,890,117 B1
(45) Date of Patent: Feb. 15, 2011

(54) AUTOMATIC REMOTE COMMUNICATION USING NETWORK TELEPHONY

(75) Inventor: Mohammad R. Zonoun, Sunnyvale, CA (US)

(73) Assignee: Nortel Networks Limited, Mississauga, Ontario (CA)

( * ) Notice: Subject to any disclaimer, the term of this patent is extended or adjusted under 35 U.S.C. 154(b) by 0 days.

(21) Appl. No.: 09/522,325

(22) Filed: Mar. 9, 2000

(51) Int. Cl.
*H04W 24/00* (2009.01)

(52) U.S. Cl. .............. 455/456.1; 455/440; 455/414.1; 340/538.11

(58) Field of Classification Search .......... 455/440, 455/414.1, 456, 414, 404, 521, 456.1, 404.1; 340/538.11, 854.1, 993, 426.19, 539.13, 340/825.36, 825.49, 538.1
See application file for complete search history.

(56) References Cited

U.S. PATENT DOCUMENTS

| | | | | |
|---|---|---|---|---|
| 4,847,577 A * | 7/1989 | Gerhart et al. | ................. | 327/37 |
| 5,214,757 A * | 5/1993 | Mauney et al. | ............... | 715/751 |
| 5,544,225 A * | 8/1996 | Kennedy et al. | ............ | 455/412 |
| 5,684,859 A * | 11/1997 | Chanroo et al. | ............. | 455/433 |
| 5,737,328 A * | 4/1998 | Norman et al. | ............. | 370/331 |
| 5,764,690 A * | 6/1998 | Blanchard et al. | ........... | 375/147 |
| 5,831,545 A * | 11/1998 | Murray et al. | ............. | 340/7.27 |
| 5,835,907 A * | 11/1998 | Newman | ..................... | 707/10 |
| 6,084,862 A * | 7/2000 | Bjork et al. | .................. | 370/292 |
| 6,124,806 A * | 9/2000 | Cunningham et al. | .. | 340/870.02 |
| 6,148,069 A * | 11/2000 | Ekstrom et al. | ........ | 379/221.08 |
| 6,148,178 A * | 11/2000 | Nelms et al. | ............... | 340/7.55 |
| 6,169,895 B1 * | 1/2001 | Buhrmann et al. | .......... | 455/423 |
| 6,404,388 B1 * | 6/2002 | Sollenberger et al. | ....... | 342/387 |
| 6,477,363 B1 * | 11/2002 | Ayoub et al. | ................ | 455/404 |
| 6,603,977 B1 * | 8/2003 | Walsh et al. | .................. | 379/45 |
| 2003/0093218 A1 * | 5/2003 | Jones | ........................ | 701/201 |

OTHER PUBLICATIONS

Inter-Tell Incorporated, *Internet Telephony—A White Paper*, IP T Solutions, Mar. 5, 2000, 6 pages, World Wide Web Internet Address: http://www.inter-tel.com/products/ip/white_paper.html.
Yahoo!Finance, *Ominpoint Launches Enhanced 911 Service in New Jersey First Wireless Carrier in State to Meet FCC Emergency Calling Rules*, Oct. 25, 1999, Omni.
Pount Corporation, Cedar Knolls, N.J., p. 1-3. World Wide Web Internet Address: http://biz.yahoo.com/prnews/991025/nj_omnipoi_1.html.
Raj Jain, Ohio State University, *Voice Over IP: Issues and Challenges*, p. 1-13, World Wide Web Internet Address: http://www.cis.ohio-state.edu/-jain/html.

* cited by examiner

*Primary Examiner*—Nghi H Ly
(74) *Attorney, Agent, or Firm*—Blakely Sokoloff Taylor & Zafman, LLP

(57) ABSTRACT

The present invention is a method and apparatus to provide remote communication using network telephony. In a transmitter, an activation message is decoded to generate an activation command. The activation message is sent from an activator via a communication medium in response to a telephony call. An information message is transmitted, responsive to the activation command, to a receiver using a communication protocol. In a receiver, an activation message is decoded to generate an activation command. The activation message is sent in response to a telephone call. An information message is received, responsive to the activation command. The information message is sent from a transmitter according to a communication protocol via a communication medium.

80 Claims, 5 Drawing Sheets

AUTOMATIC REMOTE COMMUNICATION USING NETWORK TELEPHONY

BACKGROUND

1. Field of the Invention

This invention relates to computer networks. In particular, the invention relates to network telephony.

2. Description of Related Art

Packet-based data networks are widely used to link various nodes, such as personal computers, servers, gateways, and so forth. Packet-based data networks include private networks, such as local area networks (LANs), Metropolitan Area Networks (MANs), Wide Area Networks (WANs), and public networks, such as the Internet. The increased availability of such data networks has increased accessibility among nodes, whether the nodes are located in close proximity to each other (such as within an organization) or at far distances from each other. Popular forms of communications across such data networks include electronic mail, file transfer, web browsing, and other exchanges of digital data>

With the increase capacity and reliability of data networks, voice communications over data networks, including private and public networks, have become possible. Voice communications over packet-based data networks are unlike voice communications in a conventional public switch telephone network (PSTN), which provides users with dedicated end-to-end circuit connections for the duration of each call. Communications over data networks, such as IP (Internet Protocol) networks, are performed using packets that are sent in bursts from the source to one or more destination nodes. To enable voice communications between end points on a data network, a virtual circuit connection is established between the end points. Voice data sent over a data network has to share the network bandwidth with conventional non-voice data (e.g., electronic mail, file transfer, web access, and other traffic). One standard that has been implemented for communications of voice as well as other data is the H.323 recommendation from the Telecommunications Sector of the International Telecommunication Union (ITU-T), which describes terminals, equipment and services for multimedia communications over packet-based networks.

In an IP data network, each data packet is routed to a node having destination IP address contained within the header of each packet. Data packets may be routed over separate network paths before arriving at the final destination for reassembly. Transmission speeds of the various packets may vary widely depending on the usage of data networks over which the data packets are transferred. During peak usage of data networks, delays added to the transfer of voice data packets may cause poor performance of voice communications.

Despite the increasing popularity of communicating over IP data networks, several applications have presented difficulties to the integration of IP telephony in a traditional communication environment. One example is the Enhanced 911 (E911) emergency call. The E911 regulatory requirements require location information concerning where the 911 caller is located. With a switched network this problem was solved by the transmission of the caller's telephone number to a Public Safety Answering Point (PSAP) where it was cross-referenced with an address database to determine the caller's location. That information was then displayed on a video monitor for the emergency dispatcher to direct public safety personnel responding to the emergency. This enabled emergency organizations to find callers who could not orally provide their precise location. Although this problem has been solved for conventional public switched telephone systems such as in a public switched telephony network, the problem still exists for data networks, and in particular, location identification using IP telephony. First, the IP telephones are not tied or physically connected to a geographical location and thus their locations may be dynamic. Second, the information retrieval is not scaleable because there are a large number of IP domains and service provider policies (e.g., telephone companies, cable companies, and cellular companies).

A further issue is that congestion on the data network may slow emergency communications traffic. Thus there is a need for prioritization of the emergency traffic to ensure a high degree of quality of service.

Since each IP address has no geographic association, there is no provision for locating a network resource such as a server, a router, a gateway, or an IP terminal. If a fault occurs in a network resource, there is no way of geographically locating that resource. Thus, it would be desirable to provide network resources with geographic information for the purpose of resource location. Furthermore, it would be desirable to locate the nearest network resource to a terminal in the event that the terminal cannot locate its geographic position.

In addition, IP telephony has been expensive to implement for applications involving the monitoring of environmental conditions, and remote meter reading, since each station required a dedicated connection to the IP network. Thus, there is a need for providing IP enabled applications with a communication means to communicate with a data network.

Therefore, there is a need in the art for an efficient and low-cost technique for automatic remote communication using telephony.

SUMMARY

The present invention is a method and apparatus to provide remote communication using network telephony. In a transmitter, an activation message is decoded to generate an activation command. The activation message is sent from an activator via a communication medium in response to a telephony call. An information message is transmitted, responsive to the activation command, to a receiver using a communication protocol. In a receiving unit, an activation message is decoded to generate an activation command. The activation message is sent in response to a telephony call. An information message is received, responsive to the activation command. The information message is sent from a transmitter according to a communication protocol via a communication medium.

According to one embodiment of the present invention, the information message includes a location identifier corresponding to location of the transmitter. The location identifier may be stored in advance or dynamically provided by GPS data. The communication protocol uses one of a multi-frequency tone, an ultra-red signal, a microwave signal, and an electromagnetic signal. The transmitter includes a modulator to modulate the information message according to a modulating scheme. The receiving unit includes a demodulator to demodulate the information message according to a demodulating scheme. The telephony call is made by a person located in proximity of the location of the transmitter. The telephony call may be one of an emergency call using an emergency call number, a transactional call for a commercial transaction, or an intrusive call.

The advantages of the invention include (1) provision of accurate, secure, and trusted location information, (2) compatibility with current telephony, computer devices, all technologies, and regulatory requirements, (3) ease in integration and implementation, (4) low cost, and (5) readiness for industry acceptance and standardization.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The features and advantages of the present invention will become apparent from the following detailed description of the present invention in which.

DESCRIPTION

Figure 1:
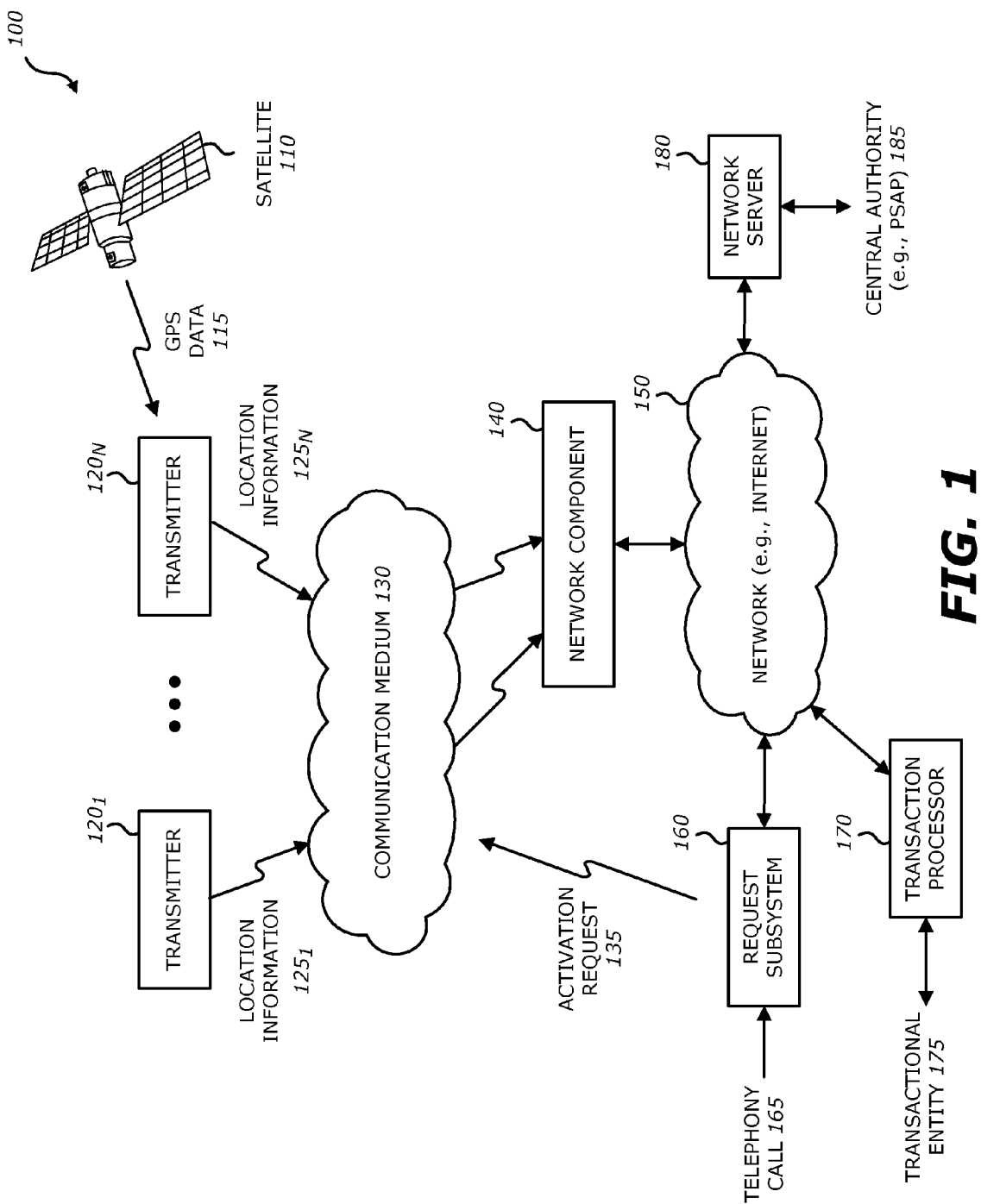
FIG. 1 is a diagram illustrating a system according to one embodiment of the invention.

The present invention is a method and apparatus to provide remote communication using network telephony. In a transmitter, an activation message is decoded to generate an activation command. The activation message is sent from an activator via a communication medium in response to a telephony call. An information message is transmitted, responsive to the activation command, to a receiver using a communication protocol. In a receiving unit, an activation message is decoded to generate an activation command. The activation message is sent in response to a telephony call. An information message is received, responsive to the activation command. The information message is sent from a transmitter according to a communication protocol via a communication medium.

According to one embodiment of the present invention, the information message includes a location identifier corresponding to location of the transmitter. The location identifier may be stored in advance or dynamically provided by GPS data. The communication protocol uses one of a multi-frequency tone, an ultra-red signal, a microwave signal, and an electromagnetic signal. The transmitter includes a modulator to modulate the information message according to a modulating scheme. The receiving unit includes a demodulator to demodulate the information message according to a demodulating scheme. The telephony call is made by a person located in proximity of the location of the transmitter. The telephony call may be one of an emergency call using an emergency call number, a transactional call for a commercial transaction, or an intrusive call. The emergency call number may be the "9-1-1" in the United States.

The advantages of the invention include (1) provision of accurate, secure, and trusted information, (2) compatibility with current telephony, computer devices, all technologies, and regulatory requirements, (3) ease in integration and implementation, (4) low cost, and (5) readiness for industry acceptance and standardization.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the method is implemented in a station as a software routine, hardware circuit, firmware, or a combination thereof.

Embodiments of the invention may be represented as a software product stored on a machine-readable medium (also referred to as a computer-readable medium, a processor-readable medium, or a computer usable medium having a computer readable program code embodied therein). The machine-readable medium may be any type of magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data. Those of ordinary skill in the art will appreciate that other instructions and operations necessary to implement the described invention may also be stored on the machine-readable medium. Software running from the machine readable medium may interface with circuitry to perform the described tasks.

FIG. 1 is a diagram illustrating a system 100 according to one embodiment of the invention. The system 100 includes a satellite network 110, N transmitters $120_1$ to $120_N$, a communication medium 130, a network component 140, a network 150, a request subsystem 160, a transaction processor 170, and a network server 180.

The satellite network 110 includes a number of GPS satellites orbiting around the earth to provide GPS data 115 relating to positional information. The GPS data 115 is received by the transmitters $120_1$ to $120_N$ to determine the positional information.

The transmitters $120_1$ to $120_N$ broadcast information to the network component 140 via the communication medium 130. The information from the transmitters $120_1$ to $120_N$ are embedded in signals $125_1$ to $125_N$, respectively. The information may include location information, measurement information, or meter reading information. The transmitters $120_1$ to $120_N$ broadcast the information either at request upon receiving an activation request 135 from the request subsystem 160 or automatically, either on a substantially periodic basis or continuous basis. The communication medium 130 is any medium (e.g., air) that can carry the signals $125_1$ to $125_N$ and the activation request 135. In one embodiment, the transmitters $120_1$ to $120_N$ are geographically dispersed to form a distributed location broadcast system. The location broadcast system is used in a number of applications that require the location information transmitted via IP telephony and/or computer network.

The network component 140 is a unit or subsystem that can be networked with other networkable components via the network 150. The network component 140 receives and processes the information transmitted or broadcast by at least one of the transmitters $120_1$ to $120_N$. The network 140 sends the processed information to other components connected to the network 150 such as the transaction processor 170 or the network server 180. The network component 140 is configured to be used in any applications that require receiving information (e.g., location information) from the transmitters $120_1$ to $120_N$. These applications may include emergency call location reporting (e.g., E911), commercial transactions (e.g., food delivery), intrusion detection (e.g., detecting location of an intrusive caller or harasser). The network component 140 may be an emergency server, or associated with a transactional entity 175 via the transaction processor 170.

The network 150 is any network that allows messages or data packets to be sent and received. The network 150 may be a data enabled PBX, a public switched telephone network (PSTN), a local area network (LAN), a wide area network (WAN), a metropolitan area network (MAN), an extranet, an intranet, or the Internet. The network 150 typically has some protocol or standard that allows voice and data to be transmitted and received. In one embodiment, the network 150 is a data network having the voice over Internet Protocol (IP) capability. Protocols that govern the voice over IP may include the standards provided by the ITU such as the H.323 standard.

The request subsystem 160 generates the activation request or message 135 to be sent to the transmitters to request for information in response to a telephony call 165. The request subsystem 160 is connected to the network 150 to exchange network data with other network components. The telephony call 165 is a call that is processed by the IP telephony including voice calls and multimedia calls (e.g., teleconference call, audio and/or video call). The call is normally made by a person, or activated by a machine. The call may be made by a person who requests emergency assistance (e.g., E911), or a person who requests a commercial transaction (e.g., food delivery), or an intruder who makes harassing calls to others.

The transaction processor 170 performs transactional processing tasks in a transaction for a transactional entity 175. The transaction may be a commercial or a financial transaction. For example, the transaction entity 175 may be a food delivery establishment who wishes to confirm or verify the location of the delivery destination. The location information can be automatically sent from one of the transmitters $120_1$ to $120_N$ to the transaction processor 170 via the network 150 when the person makes a telephony call 165. This automatic remote communication saves time and reduces error in getting the location information based on verbal communication. The transaction processor 170 may have storage medium and display unit to automatically store and/or display the received information.

The network server 180 is a server that acts as a network gateway to provide interface to the network 150. The central authority 185 is an authority (e.g., local government, public utility) or station that receives the information sent by the transmitters. For E911 applications, the central authority 185 is the Public Safety Answering Point (PSAP) and the information embedded in the signals includes the automatic number identification (ANI) and the automatic location identification (ALI). In environmental reporting applications, the central authority 185 may be an environmental data gathering agency that collects environmental data and distributes to news agencies or other environmental agencies. In remote metering reading applications, the central authority 185 may be a public utility agency that collects the meter readings of utilities and records for load balancing, load monitoring, or billing purposes.

Figure 2:
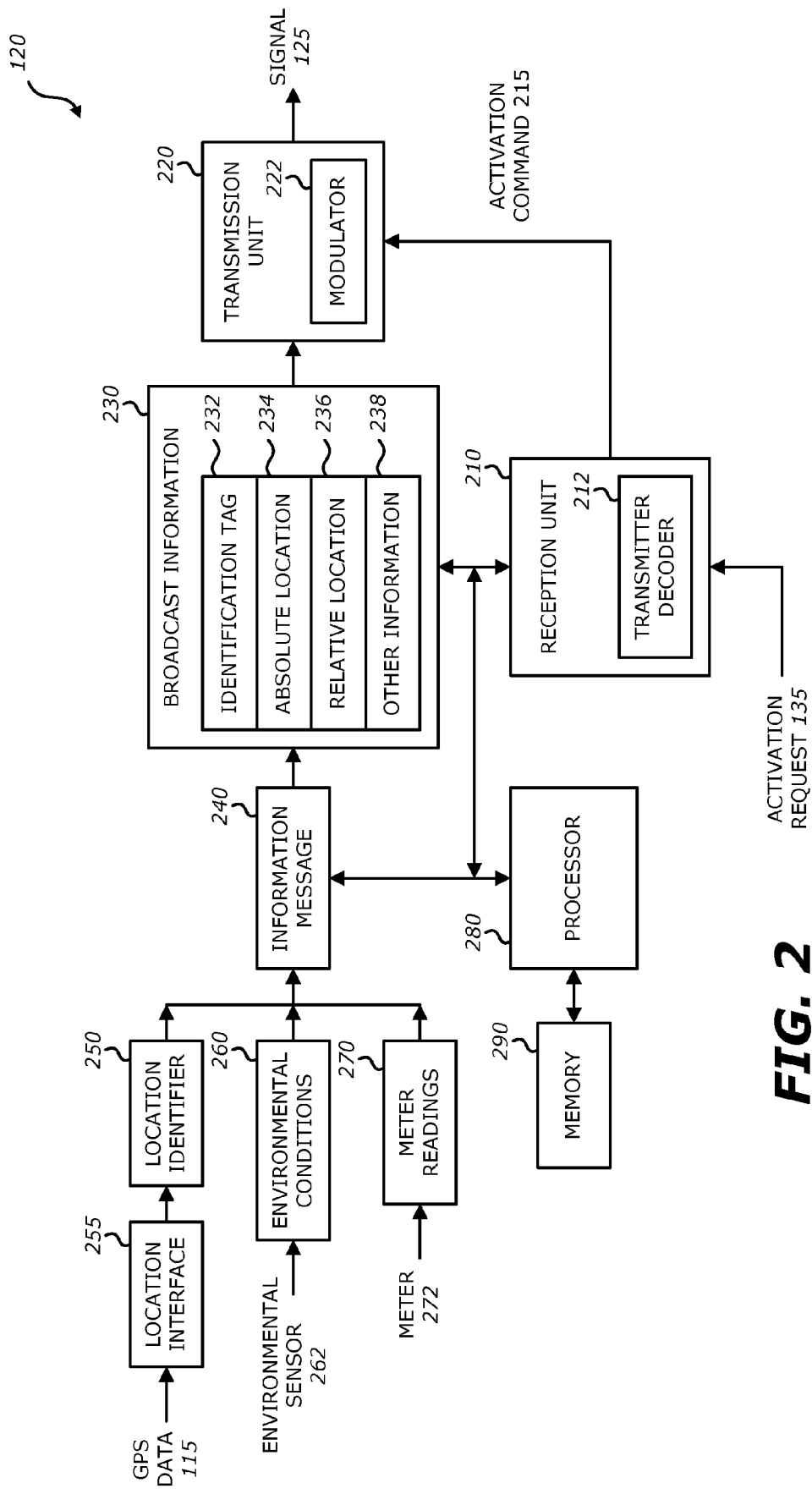
FIG. 2 is a diagram illustrating a transmitter shown in FIG. 1 according to one embodiment of the invention.

FIG. 2 is a diagram illustrating one of the transmitters $120_1$ to $120_N$ shown in FIG. 1 according to one embodiment of the invention. The transmitter 120 includes a reception unit 210, a transmission unit 220, a broadcast information 230, an information message 240, a location interface 255, a processor 280, and a memory 290.

The transmitter 120 is a device that transmits a signal 125 upon receiving the activation request 135 or continuously without request. In one embodiment of the invention, the transmitter 120 is a stand-alone device, in a wall or ceiling mountable case. The transmitter 120 may alternatively be embedded in a building or any area where the present invention might have application. In other embodiments of the invention, the transmitter 120 may be built into an always-on appliance such as a security system, a smoke detector, a server, a telephony apparatus, as an adjunct to an electrical or telecommunications socket or the like. For portable applications, such as when the transmitter 120 is not fixed to a permanent location, the location interface 255 is a Global Positioning System (GPS) element for the provision of positional data. The location interface 255 processes received signals from orbiting satellites to derive positional information to an estimated mean accuracy of plus or minus 100 feet. Additionally, Differential GPS (DGPS) positioning techniques may be used, in which signals from a local transmitter and orbiting satellites are processed to compute an extremely precise location, with a much smaller error than using conventional GPS techniques. Positional data may also be provided to the transmitter 120 from a device that calculates a position by processing signals from ground-based stations with fixed locations. Further, accurate altitude information may be calculated by a processor taking an input from a barometric pressure sensor and a local barometric pressure setting. The local barometric pressure setting may be received automatically from a local weather reporting station, or over a network connection, for example, from a weather data provider. There are various techniques know in the art for deriving such positional information, and any one of these positioning devices may be coupled with transmitter 120.

Alternative to transmitting positional data, the transmitter 120 may transmit a predetermined code, wherein the code has an associated location that is registered with an address database. This code may be cross-referenced with the associated location.

In some embodiments, any of the above geographical locating methods and apparatus may be used in conjunction with the transmitter 120 when programming the location information either into the device or when sending the location information to an address database that stores geographical location information associated with a predetermined code.

In environmental reporting applications, the transmitter 120 is located near the environmental location. In remote meter reading applications, the transmitter 120 is located near the meter. The signal 125 carries an information message to be sent over the network 150.

The reception unit 210 receives the activation request 135 sent from the request subsystem 160 (FIG. 1). The reception unit 210 includes a transmitter decoder 212. The transmitter decoder 212 receives and decodes the activation request/message 135. In most cases, the transmitter decoder 212 is a signal detector that detects the signal carrying the activation request 135. The signal carrying the activation request 135 may be a signal having a predefined frequency, code, or bit pattern and the signal detector is designed to detect any signal with that predefined frequency, code, or bit pattern. The reception unit 210 generates an activation command 215 to the transmission unit 220. The transmission unit 220 receives the activation command 215 and retrieves the broadcast information 230. The transmission unit 220 includes a modulator 222 which modulates the broadcast information 230 according to a pre-defined communication protocol that is designed to be compatible with the network component 140. The modulated information message 230 becomes one of the signals $125_1$ to $125_N$ to be transmitted over the communication medium 130. The signal 125 may be any one of a multi-frequency (MF) signal, an ultra-red signal, an infra-red signal, a microwave signal, a RF signal, or any other electromagnetic or optical signal.

In one embodiment, the signal modulation uses a pseudo random binary sound (PRBS) technique. The PRBS codes can generate many different code sequences and therefore can help differentiate many different locations. In other words, several transmitters can be installed in close proximity without having too much interference. The PRBS signal behaves like white noise and is therefore less intrusive and would not cause interference to other signal transmissions. Lastly, the PRBS signal level can be very low, resulting in low power consumption, such that the transmitter can be turned on all the time. In this case, it is possible that there is no need to have a transmitter activator. When the telephony number is detected, it is only necessary to activate the receiver to receive the PRBS signal.

The broadcast information 230 is the information to be transmitted by the transmission unit 220. The broadcast information 230 incorporates the contents of the information message with other information and includes any one of an identification tag 232, an absolute location 234, a relative location 236, and other information 238. The broadcast information 230 is arranged according to a predefined format that can be identified and decoded by the network component 140. The absolute and relative locations 234 and 236 are used in applications requiring location information such as the GPS data. The absolute location corresponds to an absolute reference to a location. The absolute reference includes geographical coordinates such as longitudinal and latitudinal data.

The information message 240 is any message that is to be sent to network 150 according to the application in which this invention is practiced. There are numerous applications that the remote communication technique in this invention can be used. Some examples of these applications include emergency reporting (e.g., E911), geographical location reporting, geographical location verification, information gathering, environmental conditions reporting, remote meter reading, electronic commerce, commercial transactions, and intrusion detection.

In the E911 application, the information message 230 includes a location identifier 250 that identifies the location of the transmitter 120 or the general location where the transmitter 120 is located. The location identifier 250 may include global positioning system (GPS) data including longitudinal, latitudinal, and altitude and other x, y, z coordinate information. When the transmitter 120 is installed in an office building, a hotel, a shopping mall, a large public or private space, or any structure, the location identifier 250 may include the specific street address, the street name, the address number, the suite number, the floor number, the room number, or any other location identification information. In this application, typically the location is known at the time the transmitter 120 is installed. Therefore, the information message 230 may be pre-programmed or entered with the specific information. When the transmitter 120 is installed at another different location, the information message 240 can be re-programmed, re-coded, or re-entered with the new location information. The information message 240 may be stored in a programmable read only memory (PROM) such as flash memory. The flash memory can be re-programmed remotely via some communication interface at the time the transmitter 120 is installed.

In the environmental reporting, the information message 240 may include environmental conditions 260 in the area that the transmitter 120 is installed. The environmental conditions 260 may include temperature, humidity, wind speed, barometric pressure, etc. In these applications, the information message 240 may be constantly updated, periodically updated, or updated at the time of activation to reflect the current environmental condition. The environmental condition is provided by an environmental sensor 262 such as a temperature sensor, a humidity sensor, a pressure sensor, and a wind speed meter.

In remote meter reading, the information message 240 may include a meter reading 270 from a meter 272. The meter 272 may be installed to reported utility usage such as electricity, water, or gas consumption at the facility that the transmitter 120 is installed. The information message 240 may be constantly updated or updated only at the time of activation to reflect the current reading of the meter.

The processor 280 is typically an embedded micro-controller that can execute code to control the operation of the transmitter 120. In some applications, the processor 280 may be optional. The processor 280 is interfaced to the memory 290. The memory 290 may include a random access memory (RAM) and/or read only memory (ROM) to store program code or data. The processor 280 executes computer readable program code for decoding the activation message 135, modulating the broadcast information 230, and transmitting the signal 125 to the communication medium 130.

Figure 3:
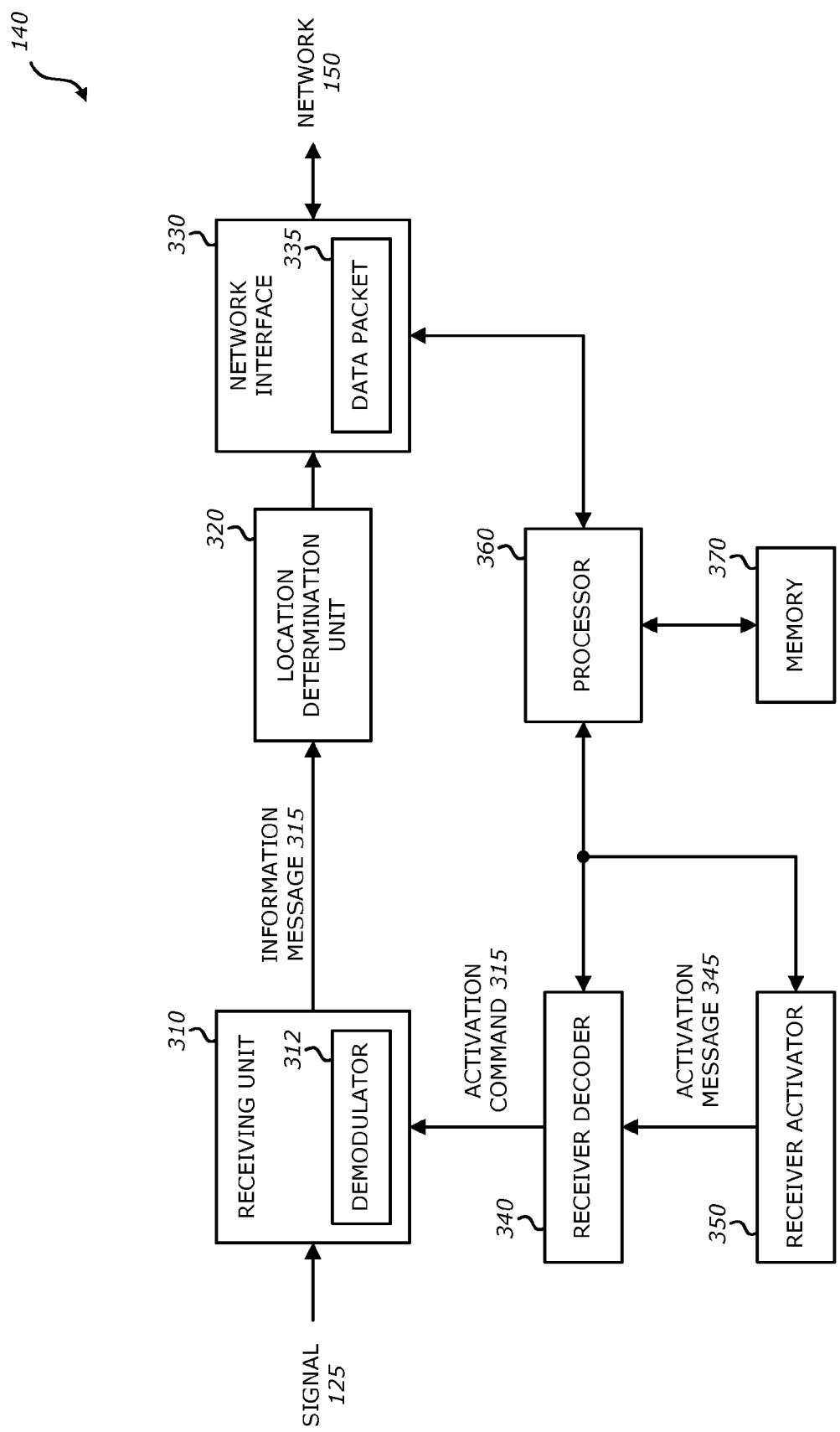
FIG. 3 is a diagram illustrating a network component shown in FIG. 1 according to one embodiment of the invention.

FIG. 3 is a diagram illustrating the network component 140 shown in FIG. 1 according to one embodiment of the invention. The network component 140 includes a receiving unit 310, a location determination unit 320, a network interface 330, a receiver decoder 340, a receiver activator 350, a processor 360, and a memory 370.

The receiving unit 310 receives the signal 125 sent from the transmitters 120. The receiving unit 310 is activated by an activation command 315 from the receiver decoder 340 and is enabled to receive the signal 125 carrying the broadcast information 230 (FIG. 2). The receiving unit 310 includes a demodulator 312 to demodulate the received signal 125 and provides the extracted information message 315. The extracted information message 315 is essentially the same as the information message 240 (FIG. 2). The receiving unit 310 then sends the extracted information message 315 to the location determination unit 320. The location determination unit 320 is used in applications that require the location information. The location determination unit 320 determines the location embedded in the extracted information message 315. This may include calculations of x, y, z coordinates based on the GPS data, distance estimates, or any other necessary calculations.

The network interface 330 allows the network component 140 to interface to the network 150. The network interface 330 includes a data packet 335 to be sent to other networked components. The data packet 335 includes the extracted information message 315.

The processor 360 is typically an embedded micro-controller that can execute code to control the operation of the network component 140. The processor 360 may be a media processor with telephony capabilities or a digital signal processor (DSP) to perform other signal processing tasks. In some applications, the processor 360 may be optional. Processor 360 may also be implemented by other control means such as a dedicated logic circuitry, programmable gate array (PGA), a microcontroller, a microprocessor, a an application specific integrated circuit (ASIC), or hybrids of these. The processor 360 is interfaced to the memory 370. The memory 370 may include a mass storage device (e.g., CD ROM, floppy drive, hard disk drive), random access memory (RAM) and/or read only memory (ROM) to store program code or data. The processor 360 executes computer readable program code for decoding the activation message 345, demodulating the signal 125, and generating the extracted information message 315.

The receiver decoder 340 decodes an activation command 315 sent from the receiver activator 350 when the signal 125 is to be received. The receiver activator 350 may be connected to the receiver decoder 340 via an electronic interface such as a parallel data interface or a serial data interface over a serial data bus, or an electromechanical switching mechanism such as a relay. The receiver activator 350 may be a software program code executed by the processor 360, or a hardware mechanism controlled by the processor 360. The receiver activator 350 sends an activation message 345 to the receiver decoder 340 in response to the telephony call 165.

Figure 4:
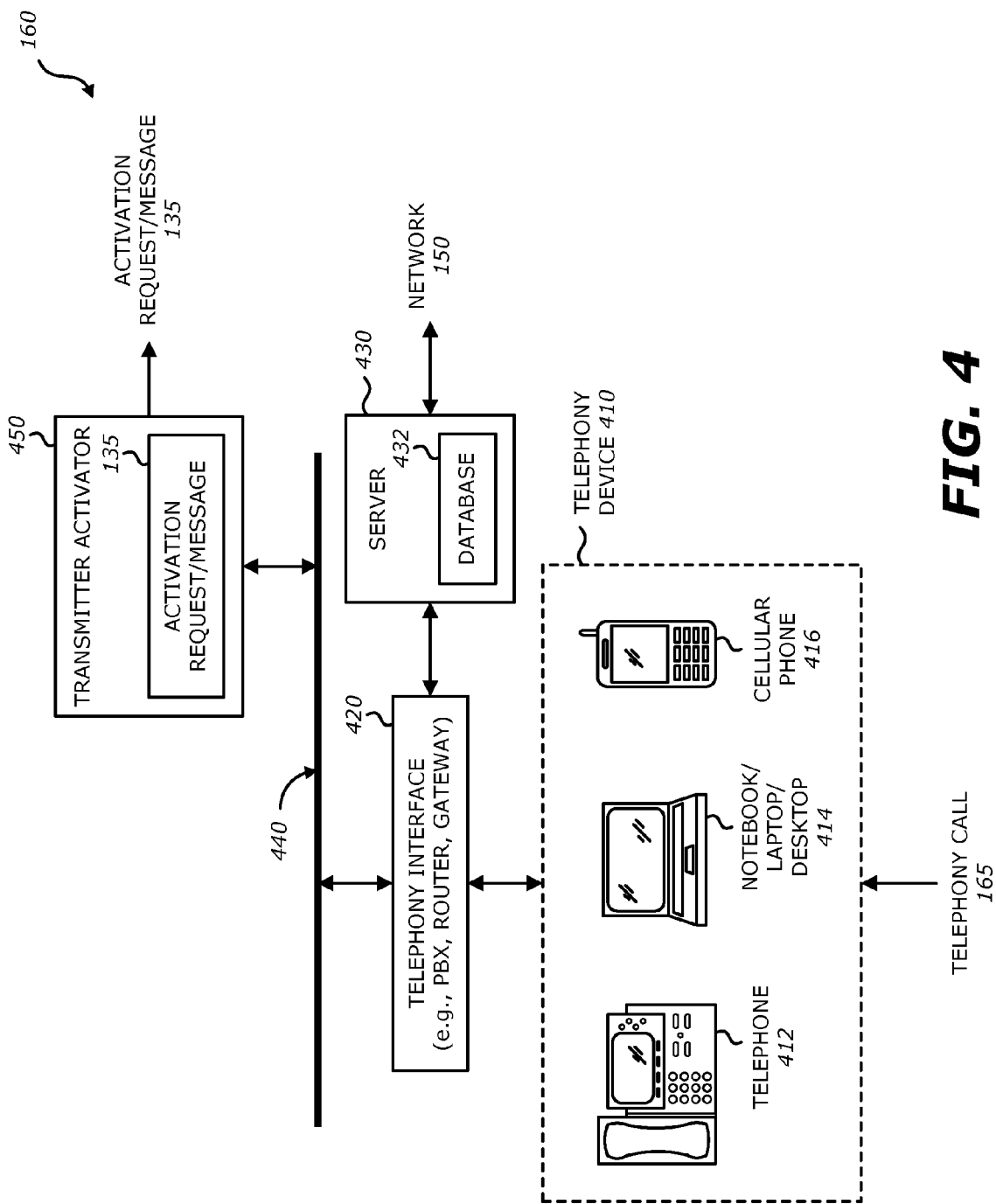
FIG. 4 is a diagram illustrating a request subsystem shown in FIG. 1 according to one embodiment of the invention.

FIG. 4 is a diagram illustrating the request subsystem 160 shown in FIG. 1 according to one embodiment of the invention. The request subsystem 160 includes a telephony call device 410, a telephony interface 420, a telephony server 430, a telephony connection path 440, and a transmitter activator 450. In some applications, not all of the elements in the request subsystem 160 are necessary.

The call device 410 is a device that provides telephony service and transmits the telephony call 165. The call device 410 may be a telephone unit 412, a computer 414 (e.g., a notebook, a personal digital assistant, a laptop, and a desktop computer) with telephony capabilities, and a cellular telephony device 416. A person can use the call device 410 in any place or location. For example, a person can use the call device 410 at home, in a hotel room, or in a public telephony booth.

The telephony interface 420 provides telephony services to the call device 410. The telephony interface 420 is optional in some instances. The telephony services include multimedia interface for voice over Internet Protocol (IP) or any other protocols. The telephony interface 420 may include a router, a gateway, or a private branch exchange (PBX) with IP telephony capabilities. The PBX routes the call made by the call device 410 through the server 430 via some programmed trunk interface. In another embodiment, the telephony interface 420 may be a device to listen to the dialed tone, or call setup signaling and detect if a certain number (e.g., 911) has been called.

The server 430 is typically installed near or at the location of the call device 410. The server 430 is connected to the network 150 and/or directly to the transmitter activator 450 to exchange network data/messages. The server 430 may be an IP gateway that allows the call to be embedded in a network data to be sent over the network 150. The server 430 may be a centralized computer system that has a database 432 for telephony services. The database 432 may include a directory of telephony numbers or people. The telephony numbers are those that need to be detected when a telephony call is made via the telephony device 410. For example, the database 432 may include the 911 number for E911 service, a phone number of a utility agency to report meter readings (e.g., for gas, water, electricity usage), a phone number of an environmental bureau to report environmental conditions (e.g., temperature, humidity). In other applications, the database 432 may include any telephony numbers that may utilize the remote communication technique in this invention. For example, businesses may find it desirable to automatically locate the calling party or to verify the location of the calling party before placing an order for a product or service. Such a need arises, for example, with food delivery companies, when receiving orders from customers via a telephony device. Thus, these business may subscribe to having their number included in database 432, such that the connection to that number causes the transmitter 120 to activate, as further described below.

The telephony connection path 440 is the telephony link that links the IP telephony interface 420 and/or the call device 410. The telephony connection path 440 may be a traditional telephony line in a home or in a business environment, a connection to a data network such as a LAN, a WAN, or a MAN, or a wireless interface to the cellular telephony 416.

The transmitter activator 450 is connected to the telephony connection path 440 and/or the server 430. The transmitter activator 450 may be integral to the server 430 or the telephony interface 420. The transmitter activator 450 sends an activation request or message 135 to the transmitter 120 via the communication medium 130 in response to a telephony call 165 made by the call device 410. In one embodiment, the communication medium 130 is air and the activation request or message 135 is modulated into any one of a multi-frequency (MF) signal, an ultra-red signal, an infra-red signal, a microwave signal, an RF signal, or any other electromagnetic or optical signal. In one embodiment, the transmitter activator 450 is interfaced to the server 430 and receives a command from the server 430 when a specified telephony number (e.g., 911) is detected. In another embodiment, the transmitter activator 450 is interfaced to the telephony connection path 440 to detect if a specified number is being dialed. For example, in a home environment, the transmitter activator 450 is a device installed at the telephone box to listen to the telephone tone being dialed. When the specified telephony number (e.g., 911) is detected, the transmitter activator 450 sends the activation request or message 135 to the transmitter 120.

Figure 5:
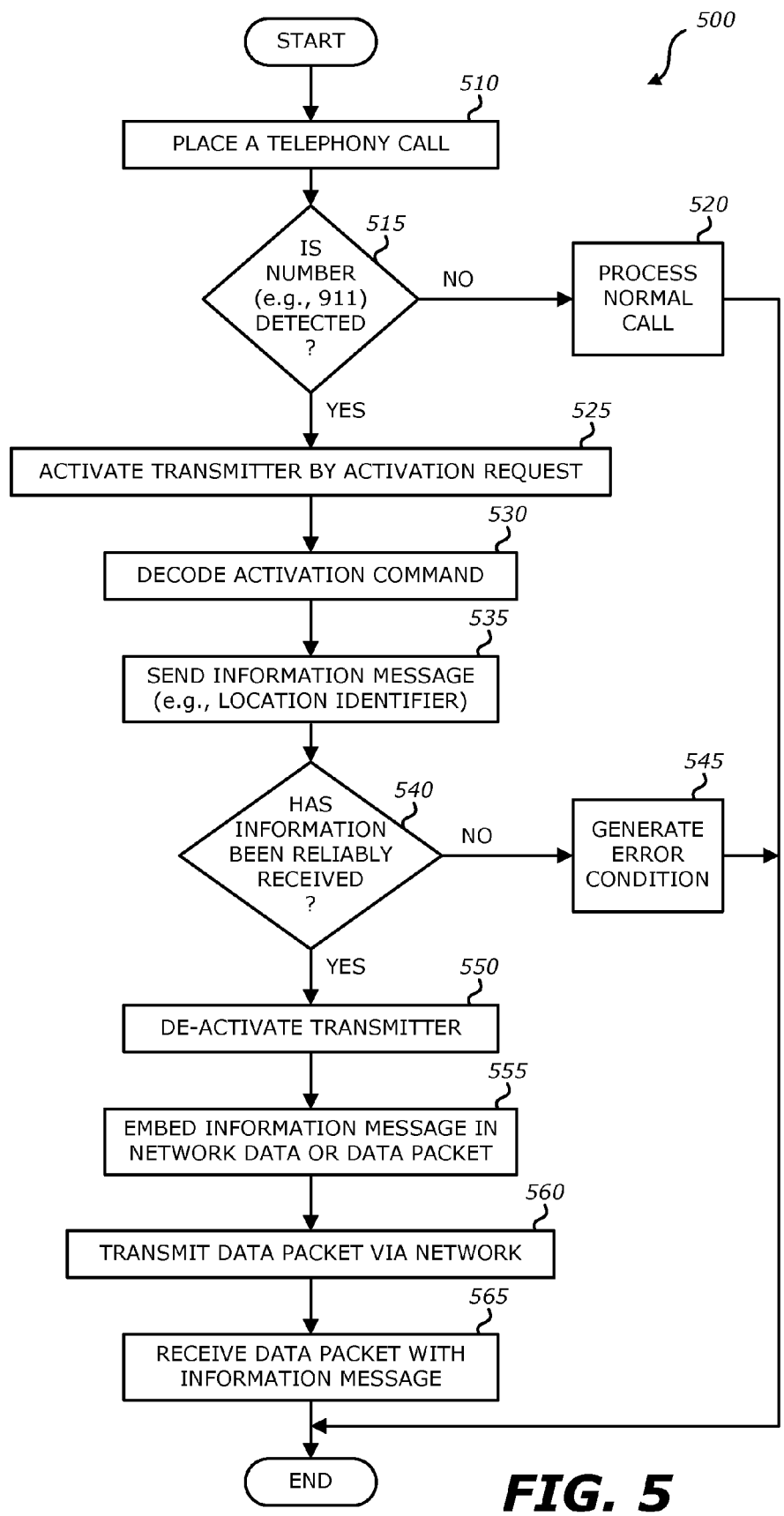
FIG. 5 is a flowchart illustrating a process for remote communication using network telephony according to one embodiment of the invention.

FIG. 5 is a flowchart illustrating a process 500 for remote communication using network telephony according to one embodiment of the invention.

Upon START, a telephony call is placed via a call device (Block 510). The call device may be a regular telephony handset, a cellular phone, or a notebook computer with audio interface capabilities. Then, the process 500 determines if the number dialed is the specified number (e.g., 911) (Block 515). If not, the process 500 proceeds to process the call as normal (Block 520) and is then terminated. Otherwise, the process 500 activates the transmitter by sending an activation request or message (Block 525).

Then, the process 500 decodes the activation message at the transmitter (Block 530). The decoding may simply involve detecting a signal with a specified characteristic (e.g., specified frequency, code). Next, the process 500 retrieves and sends the information message (e.g., location identifier) to a receiver via a communication medium (Block 535). The sending of the information message may involve modulating the information message according to a communication protocol.

Then, the process 500 determines if the information has been reliably received (Block 540). If not, the process 500 generates an error condition (Block 545) and is then terminated. Otherwise, the process 500 de-activates the transmitter (Block 550). Next, the process 500 receives the signal sent over the communication medium (Block 555). Then, the process 500 demodulates the received signal to extract the information message (Block 560). Next, the process 500 embeds the extracted information message in network data in a data packet (Block 565). Then, the process 500 sends the network data in the data packet via the network (Block 560). Next, the process 500 receives the data packet with the information message (Block 565). The process 500 is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   a decoder to decode an activation message containing a predefined frequency, code, or bit pattern, the activation message being sent from a request subsystem via a communication medium in response to a telephony call, the decoder generating an activation command upon detecting the predefined frequency, code, or bit pattern; and
   a transmitting unit coupled to the decoder to transmit a signal modulated from an information message to a receiver using a communication protocol, in response to the activation command, the information message containing a geographical location of a transmitter containing the transmitting unit.

2. The apparatus of claim 1 wherein the receiver is coupled to a server, the server embedding the information message in network data to be sent over a network.

3. The apparatus of claim 1 wherein the communication protocol uses one of a multi-frequency tone, an ultra-red signal, a microwave signal, and an electromagnetic signal.

4. The apparatus of claim 1 wherein the transmitting unit comprises a modulator to modulate the information message according to a modulating scheme.

5. The apparatus of claim 4 wherein the modulating scheme is compatible with a sound signal.

6. The apparatus of claim 5 wherein the modulating scheme uses a pseudo random binary sound (PRBS).

7. The apparatus of claim 1 wherein the information message includes a location identifier corresponding to the geographical location of the transmitter.

8. The apparatus of claim 7 wherein the location identifier includes global positioning system (GPS) information.

9. The apparatus of claim 7 wherein the telephony call is made by a person located in proximity of the geographical location of the transmitter.

10. The apparatus of claim 7 wherein the telephony call is an emergency call using an emergency call number.

11. An apparatus comprising:
    a decoder to decode an activation message containing a predefined frequency, code, or bit pattern, the activation message being sent from an activator in response to a telephony call, the decoder generating an activation command upon detecting the predefined frequency, code, or bit pattern; and
    a receiving unit coupled to the decoder to receive a signal containing an information message upon enabled by the activation command, the information message being sent from a transmitter according to a communication protocol via a communication medium and containing a geographical location of the transmitter.

12. The apparatus of claim 11 wherein the receiving unit is coupled to a server, the server embedding the information message in network data to be sent over a network.

13. The apparatus of claim 12 wherein the communication protocol uses one of a multi-frequency tone, an ultra-red signal, a microwave signal, and an electromagnetic signal.

14. The apparatus of claim 13 wherein the receiving unit comprises a demodulator to demodulate the signal according to a demodulating scheme.

15. The apparatus of claim 14 wherein the demodulating scheme is compatible with a sound signal.

16. The apparatus of claim 15 wherein the demodulating scheme uses a pseudo random binary sound (PRBS).

17. The apparatus of claim 11 wherein the information message includes a location identifier corresponding to the geographical location of the transmitter.

18. The apparatus of claim 17 wherein the location identifier includes global positioning system (GPS) information.

19. The apparatus of claim 18 wherein the telephony call is made by a person located in proximity of the transmitter.

20. The apparatus of claim 19 wherein the telephony call is an emergency call using an emergency call number.

21. A method comprising:
    decoding an activation message containing a predefined frequency, code, or bit pattern to generate an activation command upon detecting the predefined frequency, code, or bit pattern, the activation message being sent from a request subsystem via a communication medium in response to a telephony call; and
    transmitting a signal modulated from an information message responsive to the activation command, by a transmitting unit, to a receiver using a communication protocol, the information message containing a geographical location of a transmitter containing the transmitting unit.

22. The method of claim 21 further comprising embedding the information message in network data to be sent over a network.

23. The method of claim 21 wherein the communication protocol uses one of a multi-frequency tone, an ultra-red signal, a microwave signal, and an electromagnetic signal.

24. The method of claim 21 wherein transmitting comprises modulating the information message according to a modulating scheme.

25. The method of claim 24 wherein the modulating scheme is compatible with a sound signal.

26. The method of claim 24 wherein the modulating scheme uses a pseudo random binary sound (PRBS).

27. The method of claim 21 wherein the information message includes a location identifier corresponding to the geographical location of the transmitter.

28. The method of claim 27 wherein the location identifier includes global positioning system (GPS) information.

29. The method of claim 21 wherein the telephony call is made by a person located in proximity of the geographical location of the transmitter.

30. The method of claim 29 wherein the telephony call is an emergency call using an emergency call number.

31. A method comprising:
    decoding an activation message containing a predefined frequency, code, or bit pattern to generate an activation command upon detecting the predefined frequency, code, or bit pattern, the activation message being sent from an activator in response to a telephone call; and
    receiving a signal containing an information message upon enabled by the activation command, the signal being sent from a transmitter according to a communication protocol, the information message containing geographical location information of the transmitter.

32. The method of claim 31 further comprises embedding the information message in network data to be sent over a network.

33. The method of claim 32 wherein the communication protocol uses one of a multi-frequency tone, an ultra-red signal, a microwave signal, and an electromagnetic signal.

34. The method of claim 33 wherein receiving comprises demodulating the information message according to a demodulating scheme.

35. The method of claim 34 wherein the demodulating scheme is compatible with a sound signal.

36. The method of claim 35 wherein the demodulating scheme uses a pseudo random binary sound (PRBS).

37. The method of claim 31 wherein the information message includes a location identifier corresponding to the geographical location of the transmitter.

38. The method of claim 37 wherein the location identifier includes global positioning system (GPS) information.

39. The method of claim 38 wherein the telephony call is made by a person located in proximity of the transmitter.

40. The method of claim 36 wherein the telephony call is an emergency call using an emergency call number.

41. A computer program product comprising:
a machine useable medium having computer program code embedded therein, the computer program product having:
computer readable program code for decoding an activation message containing a predefined frequency, code, or bit pattern to generate an activation command upon detecting the predefined frequency, code, or bit pattern, the activation message being sent from a request subsystem via a communication medium in response to a telephony call; and
computer readable program code for transmitting a signal modulated from an information message, responsive to the activation command by a transmitting unit, to a receiver using a communication protocol, the information message containing a geographical location of a transmitter containing the transmitting unit.

42. The computer program product of claim 41 further comprises computer readable program code for embedding the information message in network data to be sent over a network.

43. The computer program product of claim 42 wherein the communication protocol uses one of a multi-frequency tone, an ultra-red signal, a microwave signal, and an electromagnetic signal.

44. The computer program product of claim 43 wherein the computer readable program code for transmitting comprises computer readable program code for modulating the information message according to a modulating scheme.

45. The computer program product of claim 44 wherein the modulating scheme is compatible with a sound signal.

46. The computer program product of claim 45 wherein the modulating scheme uses a pseudo random binary sound (PRBS).

47. The computer program product of claim 41 wherein the information message includes a location identifier corresponding to the geographical location of the transmitting unit.

48. The computer program product of claim 42 wherein the location identifier includes global positioning system (GPS) information.

49. The computer program product of claim 48 wherein the telephony call is made by a person located in proximity of the geographical location of one of the decoder and the transmitter.

50. The computer program product of claim 49 wherein the telephony call is an emergency call using an emergency call number.

51. A computer program product comprising:
a machine useable medium having computer program code embedded therein, the computer program product having:
computer readable program code for decoding an activation message containing a predefined frequency, code, or bit pattern to generate an activation command upon detecting the predefined frequency, code, or bit pattern, the activation message being sent from an activator in response to a telephony call; and
computer readable program code for receiving a signal containing an information message, upon enabled by the activation command, the information message being sent from a transmitter according to a communication protocol, the information message containing geographical location information of the transmitter.

52. The computer program product of claim 51 further comprises computer readable program code for embedding the information message in network data to be sent over a network.

53. The computer program product of claim 52 wherein the communication protocol uses one of a multi-frequency tone, an ultra-red signal, a microwave signal, and an electromagnetic signal.

54. The computer program product of claim 53 wherein the computer readable program code for receiving comprises demodulating the information message according to a demodulating scheme.

55. The computer program product of claim 54 wherein the receiver is a tone receiver compatible with the demodulating scheme.

56. The computer program product of claim 55 wherein the demodulating scheme uses a pseudo random binary sound (PRBS).

57. The computer program product of claim 51 wherein the information message includes a location identifier corresponding to the geographical location of the transmitter.

58. The computer program product of claim 57 wherein the location identifier includes global positioning system (GPS) information.

59. The computer program product of claim 58 wherein the telephony call is made by a person located in proximity of the geographical location of the transmitter.

60. The computer program product of claim 59 wherein the telephony call is an emergency call using an emergency call number.

61. A system comprising:
a request subsystem to transmit an activation message in response to a telephony call; and
a transmitter to communicate with the request subsystem via a communication medium, the transmitter comprising:
a decoder to decode the activation message containing a predefined frequency, code, or bit pattern, the decoder generating an activation command upon detecting the predefined frequency, code, or bit pattern, and
a transmitting unit coupled to the decoder to transmit a signal modulated from an information message, responsive to the activation command, to a receiver using a communication protocol, the information message containing geographical location information of the transmitter.

62. The system of claim 61 wherein the receiver is coupled to a server, the server embedding the information message in network data to be sent over a network.

63. The system of claim 62 wherein the communication protocol uses one of a multi-frequency tone, an ultra-red signal, a microwave signal, and an electromagnetic signal.

64. The system of claim 63 wherein the transmitting unit comprises a modulator to modulate the information message according to a modulating scheme.

65. The system of claim 64 wherein the modulating scheme is compatible with a sound signal.

66. The system of claim 65 wherein the modulating scheme uses a pseudo random binary sound (PRBS).

67. The system of claim 61 wherein the information message includes a location identifier corresponding to the geographical location of the transmitter.

68. The system of claim 67 wherein the location identifier includes global positioning system (GPS) information.

69. The system of claim 68 wherein the telephony call is made by a person located in proximity of the geographical location of one of the decoder and the transmitter.

70. The system of claim 69 wherein the telephony call is an emergency call using an emergency call number.

71. A system comprising:
an activator to transmit an activation message containing a predefined frequency, code, or bit pattern in response to a telephony call; and
a receiver coupled to the server, the receiver comprising:
a decoder to decode the activation message, the decoder generating an activation command upon detecting the predefined frequency, code, or bit pattern, and
a receiving unit coupled to the decoder to receive a signal containing an information message upon enabled by the activation command, the information message being sent from a transmitter according to a communication protocol via a communication medium and containing geographical location information of the transmitter.

72. The system of claim 71 further comprises a server coupled to the receiver to embed the information message in network data to be sent over a network.

73. The system of claim 72 wherein the communication protocol uses one of a multi-frequency tone, an ultra-red signal, a microwave signal, and an electromagnetic signal.

74. The system of claim 73 wherein the receiver comprises a demodulator to demodulate the information message according to a demodulating scheme.

75. The system of claim 74 wherein the demodulating scheme is compatible with a sound signal.

76. The system of claim 75 wherein the demodulating scheme uses a pseudo random binary sound (PRBS).

77. The system of claim 71 wherein the information message includes a location identifier corresponding to the geographical location of the transmitter.

78. The system of claim 77 wherein the location identifier includes global positioning system (GPS) information.

79. The system of claim 78 wherein the telephony call is made by a person located in proximity of the geographical location of the transmitter.

80. The system of claim 79 wherein the telephony call is an emergency call using an emergency call number.

* * * * *